(12) United States Patent
Kulangara

(10) Patent No.: US 7,573,680 B1
(45) Date of Patent: Aug. 11, 2009

(54) ETCHED LAMINATE STRUCTURES FOR REDUCING TRACK MIS-REGISTRATION IN A DISK DRIVE SUSPENSION

(75) Inventor: Sivadasan Kulangara, Murietta, CA (US)

(73) Assignee: Magnecomp Corporation, Temecula, CA (US)

( * ) Notice: Subject to any disclaimer, the term of this patent is extended or adjusted under 35 U.S.C. 154(b) by 754 days.

(21) Appl. No.: 11/364,127

(22) Filed: Feb. 28, 2006

Related U.S. Application Data

(60) Provisional application No. 60/732,630, filed on Nov. 1, 2005.

(51) Int. Cl.
G11B 21/16 (2006.01)

(52) U.S. Cl. .................................... 360/244.8
(58) Field of Classification Search ............. 360/244.8; 306/244.8, 294.4, 244.2, 294, 245, 244.5, 306/244.9, 234.6
See application file for complete search history.

(56) References Cited

U.S. PATENT DOCUMENTS

| | | | |
|---|---|---|---|
| 4,175,275 A | 11/1979 | Schaefer | |
| 4,208,684 A | 6/1980 | Janssen et al. | |
| 5,187,625 A | 2/1993 | Blaeser et al. | |
| 5,734,525 A | 3/1998 | Girard | |
| 5,808,834 A | 9/1998 | Jurgenson | |
| 5,839,193 A | 11/1998 | Bennin et al. | |
| 5,955,176 A | 9/1999 | Erpelding et al. | |
| 5,966,269 A | 10/1999 | Marek et al. | |
| 5,999,369 A | 12/1999 | Shimizu et al. | |
| 6,088,192 A | 7/2000 | Riener et al. | |
| 6,215,622 B1 | 4/2001 | Ruiz et al. | |
| 6,362,936 B2 * | 3/2002 | Inoue et al. | 360/244.2 |
| 6,522,624 B2 | 2/2003 | Budde | |
| 6,778,362 B1 | 8/2004 | Davis et al. | |
| 6,850,392 B1 | 2/2005 | Wong et al. | |
| 6,894,876 B1 | 5/2005 | Coon | |
| 6,977,798 B2 | 12/2005 | Schulz et al. | |
| 7,408,743 B1 * | 8/2008 | McCaslin et al. | 360/244.8 |
| 7,502,203 B1 * | 3/2009 | McCaslin et al. | 360/244.5 |
| 2002/0085314 A1 | 7/2002 | Williams | |
| 2002/0131211 A1 | 9/2002 | Nishida et al. | |
| 2003/0002220 A1 | 1/2003 | Nojima | |
| 2004/0061975 A1 * | 4/2004 | Boutaghou et al. | 360/244.8 |
| 2005/0007689 A1 | 1/2005 | Oh et al. | |
| 2005/0007701 A1 | 1/2005 | Oh et al. | |

(Continued)

*Primary Examiner*—Allen T Cao
(74) *Attorney, Agent, or Firm*—Intellectual Property Law Offices of Joel Voelzke, APC

(57) ABSTRACT

Structures and methods for creating a vertical offset between suspension springs or fingers within a suspension head assembly for use in a disk drive are disclosed, the vertical offset helping to reduce track mis-registration errors. The base plate and load beam may be made from three-layer composite materials that have been etched to create either recesses therein into which the suspension springs ends are placed and then welded, or the base plate and load beam may be etched to create mesas on which the ends of one of the suspension springs are welded. The three layers may comprise stainless steel, polyimide, and stainless steel. In another embodiment, one of the suspension springs is a three-layer material that has been etched to create a raised central portion that is vertically offset from the other suspension spring. In another embodiment, spacers are employed as shims underneath one of the suspension springs. Generally, at least one of a spring extension, the load beam and the mount beam comprise a laminate material.

30 Claims, 6 Drawing Sheets

U.S. PATENT DOCUMENTS

| | | |
|---|---|---|
| 2005/0007702 A1 | 1/2005 | Oh et al. |
| 2005/0030670 A1 * | 2/2005 | Ando et al. ............... 360/244.8 |
| 2005/0174694 A1 * | 8/2005 | Erpelding ................ 360/244.8 |
| 2005/0190502 A1 * | 9/2005 | Sassine et al. ........... 360/244.8 |
| 2007/0115590 A1 | 5/2007 | Resh et al. |

* cited by examiner

ETCHED LAMINATE STRUCTURES FOR REDUCING TRACK MIS-REGISTRATION IN A DISK DRIVE SUSPENSION

RELATED APPLICATIONS

This application claims priority from U.S. Provisional Patent Application No. 60/732,630 filed Nov. 1, 2005.

BACKGROUND OF THE INVENTION

The present invention generally relates to techniques for operating a disk drive apparatus. More particularly, the present invention provides techniques for creating a vertical offset between hinge fingers in a disk drive suspension assembly in order to reduce track mis-registration error.

A hard disc drive (HDD) unit generally uses a spinning storage medium (e.g., a disk or platter) to store data. A read-write head is positioned in close proximity to the spinning storage medium by an HSA (Head Stack Assembly). Mounted on the HSA, a suspension assembly commonly includes a base plate, a load beam, and a flexure trace gimbal to which a slider is mounted. Alternatively the read-write head may be positioned by an integrated arm mounting assembly (known in the art as "Unimount") including a mount plate adapted to a pivot bearing assembly at the proximal end and a load beam, flexure trace gimbal, and slider at the distal end. The slider supports the read-write head element. The load beam is generally composed of an actuator mounting region, a spring region, and a rigid region. The spring region gives the suspension a spring force or preload to counteract the aerodynamic lift force created by the spinning storage medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the track center. Problems associated with disk flutter become more intolerable with higher track densities and disk rotation speeds.

The desirability of introducing a vertical offset in the hinges in a head suspension is described in U.S. patent application Ser. Nos. 11/119,363 and 11/119,364, both of which were filed on Apr. 29, 2005, both of which are assigned to the assignee of the present application, and both of which are herein incorporated by reference. The present invention provides structures and techniques for producing head suspension assemblies which incorporate the desired vertical offset.

INVENTION SUMMARY

The present invention provides methods and structures for producing a vertical offset within the hinges of a head suspension assembly, so that the assembly can compensate for track mis-registration errors caused by imperfections in the disk surface, flow induced vibrations, and other sources of mis-registration. Merely by way of example, the present invention is implemented using such method and apparatus with a vertical offset between at least two spring extensions (or hinges) coupling an actuator mounting region to a rigid region of a load beam. The vertical offset between spring extensions (or hinges) results in an effective hinge predisposed to move in a predetermined direction.

In the present application, the vertical offset is achieved by etching one or more portions of the assembly in which at least one of a spring extension, the load beam and the mount beam comprise a laminate. There are several different embodiments. In one embodiment of a suspension assembly for a hard disk drive, the suspension assembly includes a load beam, a mount plate, first and second spring extensions extending between the load beam and the mount plate, a vertical offset between the first and second spring extensions, and at least one etched area on at least one of the load beam and mount plate, the etched area facilitating the vertical offset.

Considering additional possible features, the mount plate and load beam may include a laminate material. The laminate material may have at least three layers. In one embodiment, the laminate material has two layers of stainless steel, and a layer of polyimide disposed between the two layers of stainless steel. A corner of the mount plate and a corresponding corner of the load beam may be etched. In another embodiment, to form two adjacent cantilevers vertically spaced from one another, the mount plate may be made of a laminate material, and on one side of one end of the mount plate, a top portion of the material can be etched off, and a bottom portion of the material on the other side can be etched off, to form the cantilevers. The mount plate may optionally be pre-split through the layers of the composite prior to being etched.

A spring extension may be formed of a laminate material, with the spring extension being etched on either end to form a raised center portion. There may be a gap between the load beam and the mount plate, the raised center portion spanning the gap. The assembly may include two spring extensions, a first spring extension being etched to form a raised center portion and a second spring extension that is relatively flat compared to the first spring extension.

In another embodiment, the mount plate has a first mesa and the load beam has a second mesa, the first and second mesas being substantially adjacent one to the other, with a spring extension extending from the first mesa to the second mesa. A second spring extension extends from a non-mesa portion of the mount plate to a non-mesa portion of the load beam.

In another embodiment, the mount plate may include a first recess and the load beam may include a second recess, with a spring arm extending from the first recess to the second recess.

Considering another aspect of the invention, a suspension assembly for a hard disk drive has a load beam, a mount plate, first and second spring extensions extending between the load beam and the mount plate, a vertical offset between the first and second spring extensions, and means for facilitating the vertical offset.

In another aspect of the invention, a method of achieving a vertical offset between a first and a second spring extension on a suspension assembly for a disk drive may include the steps of etching portions of the load beam and mount plates and extending at least one of said first and second spring extensions from an etched portion of the load beam to an etched portion of the mount plate. The method may optionally include the step of etching a mesa on at least one of the load beam and the mount plate. The etching step may include etching through at least one layer of a laminate material. The method may further include providing means for passive damping. The method may also include using a first chemical to etch a first layer of at least one of the load beam and the mount plate, and a second chemical is used to etch a second layer of at least one of the load beam and the mount plate. For example, in one example approach, the first layer is stainless steel and is etched with ferric chloride, and the second layer is polyimide and is etched with sodium hydroxide.

In another embodiment, a suspension assembly for a hard disk drive has a load beam, a mount plate, and first and second spring extensions extending between the load beam and the mount plate. At least one of the spring extensions is made with a composite material. There is a vertical offset between the first and second spring extensions, with at least one etched area on the composite material. The etched area facilitates the vertical offset.

The foregoing is but a brief summary of the invention, and further aspects of the invention will be found in the following Detailed Description, in the Drawings, and in the Claims. Consequently, the invention is not limited by this Summary.

DETAILED DESCRIPTION OF THE PREFERRED EMBODIMENTS

Techniques for operating a disk drive apparatus are provided. More particularly, the present invention provides a method and apparatus for reading and writing information onto a hard disk drive that compensate for flow induced vibrations.

Figure 1:
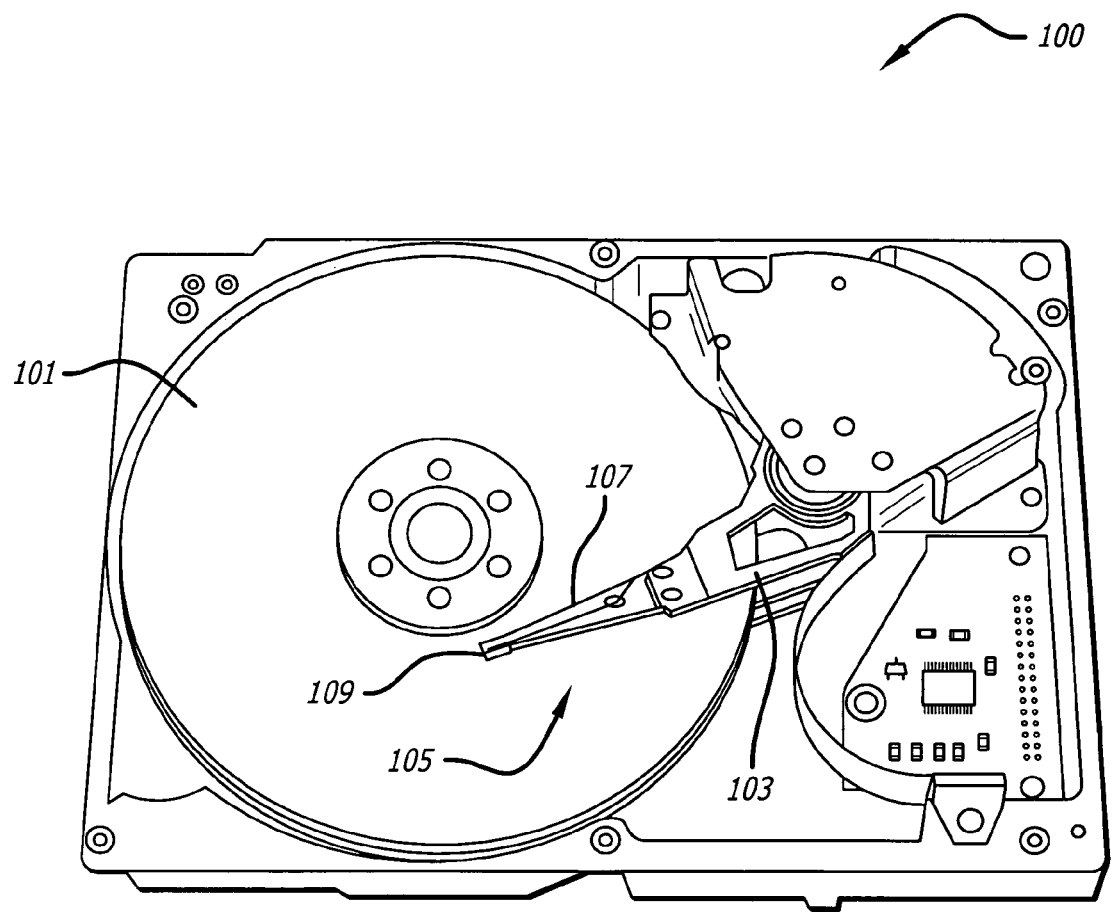
FIG. 1 is a simplified diagram of a disk drive apparatus as known in the prior art.

FIG. 1 is a simplified diagram of a disk drive apparatus 100 according to an embodiment of the present invention. Apparatus 100 includes at least one disk 101 (e.g., one, two, three, or more disks), at least one actuator arm 103 (e.g., one, two, three, or more suspension assemblies). Each suspension assembly is composed of a load beam 107, with spring extensions, and a flexure trace gimbal assembly 109. The suspension assembly, with trace gimbal assembly and read/write head, may be referred to as a Head Gimbal Assembly (HGA). This diagram, as well as other diagrams provided herein, is merely an example, which should not unduly limit the scope of the claims herein. One of ordinary skill in the art would recognize many other variations, modifications, and alternatives.

Disk 101, commonly called a platter, rotates about a fixed axis (or spindle) from about 5,000 rpm up to about 15,000 rpm depending upon the embodiment. Disk 101 stores information and thus often includes a magnetic medium such as ferromagnetic material, but it can also include optical materials, common coated on surfaces of the disk, which become active regions for storing digital bit information. The aggregate storage capacity of disk 101 will vary with track density and disk diameter. Disk 101 stores information in tracks which can be in a range of about 50,000 tracks per inch (TPI) to about 200,000 TPI, or more. The diameter of disk 101 can be 5.12 inches (e.g., for a 5.25 inch drive), 3.74 inches (e.g., for a 3.5 inch drive), or less than 2.5 inches, or even less than 1.8 or 1.0 inch.

Suspension assembly 105, which overlies (or underlies) a surface of disk 101, operates and controls a slider coupled to a read/write head (not shown). Flexure trace gimbal assembly 109 is attached to suspension assembly 105 which in turn connected to actuator arm 103. Actuator arm 103 is connected to a voice coil motor or VCM, which move suspension assembly 105 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Broadly speaking, the present invention relates, but is not limited, to method of providing a vertical offset between at least two spring extensions (or hinges) coupling an actuator mounting portion to a rigid support member (or load beam). The vertical offset between spring extensions (or hinges) results in an effective hinge predisposed to move in a predetermined direction in order to reduce track mis-registration errors. The various embodiments of the present invention generally accomplish this vertical offset by etching one or more portions of at least one component of the assembly.

Considering one aspect of the present invention, layers of a laminate material may be etched away in order to facilitate a vertical offset in two or more spring extensions connecting the load beam to the mount plate. One approach starts with a three-layer (stainless steel-polyimide-stainless steel) laminate material to make the mount plate, the hinges and/or the load beam of the suspension. The three-layer component (e.g. the mount plate, the hinges or the load beam) is then etched through the first two layers to expose the bottom stainless steel layer. The etching is confined only to certain areas of the component and in some cases the etching needs to be done both on the top and bottom surfaces of the component.

In one method of this etching technique, a two-step approach is taken. The stainless steel (which may be foil) is etched with ferric chloride, for example, or with another suitable etching compound known in the art. The polyimide is etched with sodium hydroxide, for example, or another compound suitable for etching polyimide. Etching techniques are well-known in the art, and can be outsourced to any of a number of etching companies.

After etching is complete, the components are welded together in a conventional manner. It should be noted that, in conjunction with the etching techniques and some of the embodiments discussed below, the number of welds may be reduced as compared to traditional hinge structures.

Figure 2:
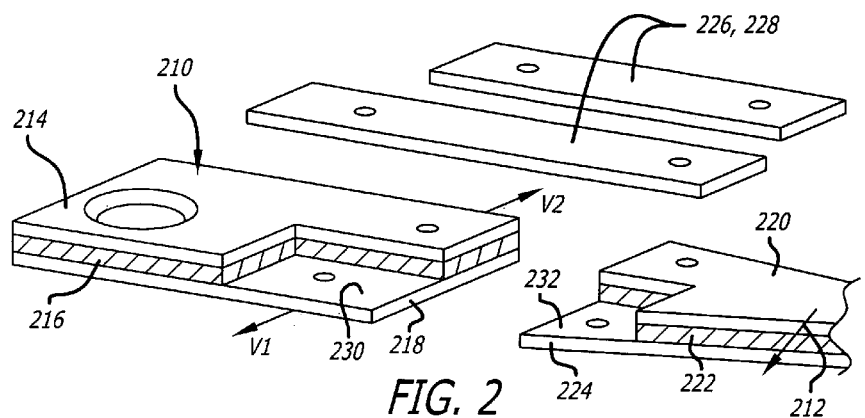
FIG. 2 is an embodiment in which adjoining corners of the mount plate and load beam are etched, while adjacent portions of the mount plate and load beam are not etched, such that respective spring plates may be mounted at different heights.
Figure 3:
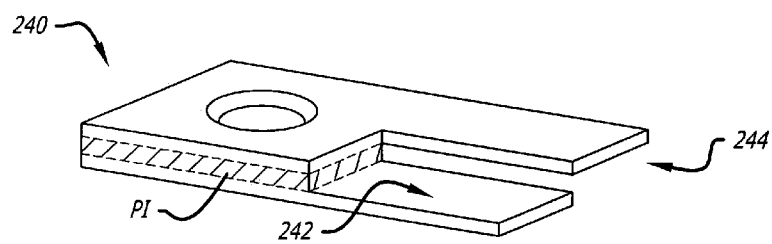
FIG. 3 is an embodiment in which the mount plate and load beam have portions on both the top and bottom that are etched, such that spring plates may be mounted on the top and bottom, respectively.
Figure 4:
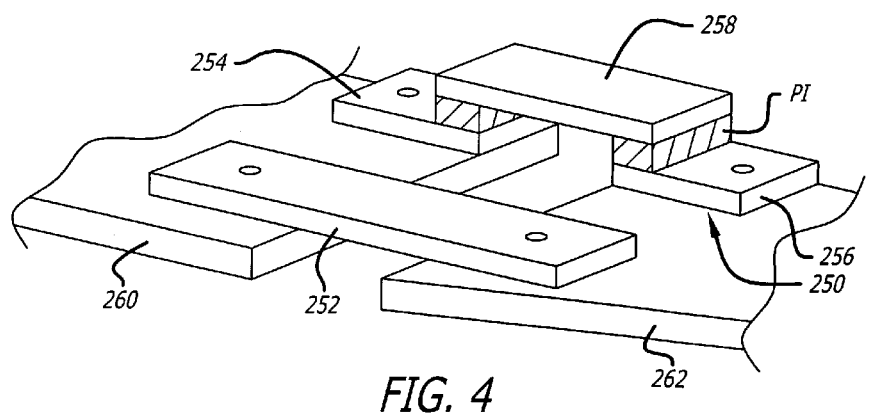
FIG. 4 is an embodiment in which one spring plate is created by etching a three-layer material to achieve a lifted central portion.

Considering now specific examples of the invention, three example configurations according to this approach are illustrated in FIGS. 2-4. In FIG. 2, both the mount plate 210 and the load beam 212 are laminates. The mount plate 210 includes a top layer of stainless steel 214, a middle layer of polyimide 216, and a bottom layer of stainless steel 218. Similarly, the load beam 212 has a top layer of stainless steel 220, a middle layer of polyimide 222 and a bottom layer of stainless steel 224. It should be understood that alternative laminate constructions can be employed, such as laminates having different layers and/or more or fewer layers, and laminates made of different materials.

In FIG. 2, the hinges (spring plates 226, 228) are two identical stainless steel sheets. After etching away two layers on the mount plate and the load beam on selected areas to form recessed areas 230 and 232 as shown, the hinges 226 and 228 are welded onto the areas 230 and 232 that have been etched out. It should be noted that in most embodiments, the members 226 and 228 should generally extend within parallel planes, as well as being vertically offset. The members 226 and 228, being in generally parallel planes and vertically offset, define a path that is inclined a bit to the normal while maintaining an attitude parallel to the nominal disk plane during vertical excursion due to disk flutter. It is also noted that the member closest to the axis of rotation of the disk is also generally the member closest to the plane of the disk, such that the member farthest from the axis of rotation is offset farther away from the plane of the disk.

In the embodiment of FIG. 3, only the mount plate 240 is a laminate. In this illustration, a steel-polyimide-steel laminate is employed. Two layers are etched away symmetrically from the top and bottom sides at areas 242 and 244, exposing the bottom and top stainless steel layers respectively at those locations. After etching, the exposed and vertically offset stainless steel cantilevers at 242, 244 form the hinge by themselves. The load beam will be inserted between the cantilevers and welded to complete the assembly.

It is noted that, as an alternative, a transverse split made before the etching process can help in separating the two limbs of the hinge. That is, a lengthwise split may be stamped into the laminate material prior to etching, defining the lengthwise boundary between what will become the two portions 242, 244 of the hinge. This split may help to reduce any surplus webbing that might otherwise appear after the etching process is finished. Also, as an alternative, the load beam might also be made of laminate and etched differentially in the same manner as the mount plate, but in a complementing fashion, then welded.

As another alternative, the mount plate, hinges and the load beam could be 'sculpted' from a single, three-layered laminate sheet. In this approach, etching is done in the middle area of the sheet to form the hinges. The load beam and the mount plate are left unetched on either ends of the hinge area.

Considering further embodiments, in FIG. 4, one of the hinges 250 is made of a laminate, while the other hinge 252 is a stainless steel sheet. The laminate hinge is etched on either end 254, 256 and also in the middle 258 from the opposite side to create a bridge-like structure. The central part of the structure is thus at a higher elevation than the ends. This etched laminate hinge, in conjunction with the conventional stainless steel hinge, are then welded onto a conventional mount plate 260 and load beam 262. The etching of hinge 250 creates the desired vertical offset.

Among the advantages of the etched laminate embodiments of FIGS. 2-4 are that the two layer welds are stronger & more reliable. Also, in a laminate, there is a relative freedom of movement between the top and bottom stainless steel layers, which are separated by an energy absorbing layer. Velocities of the top and bottom layers are marked as $V_1$ and $V_2$ in FIG. 2. Any phase difference between $V_1$ and $V_2$ would dissipate energy in the polyimide layer, and passively dampen the HGA modes. It is noted that there are many suitable visco-elastic materials other than polyimide known in the art that are suitable for use in the composite for providing the desired damping effect.

Composite structures may also be incorporated into known designs, such as those illustrated in FIGS. 5-10 in order to increase performance characteristics. In particular, etching may be used in combination with composite materials. In particular, the concepts of FIGS. 2-4 may be extended for use in the known designs of FIGS. 5 and 6.

Figure 5:
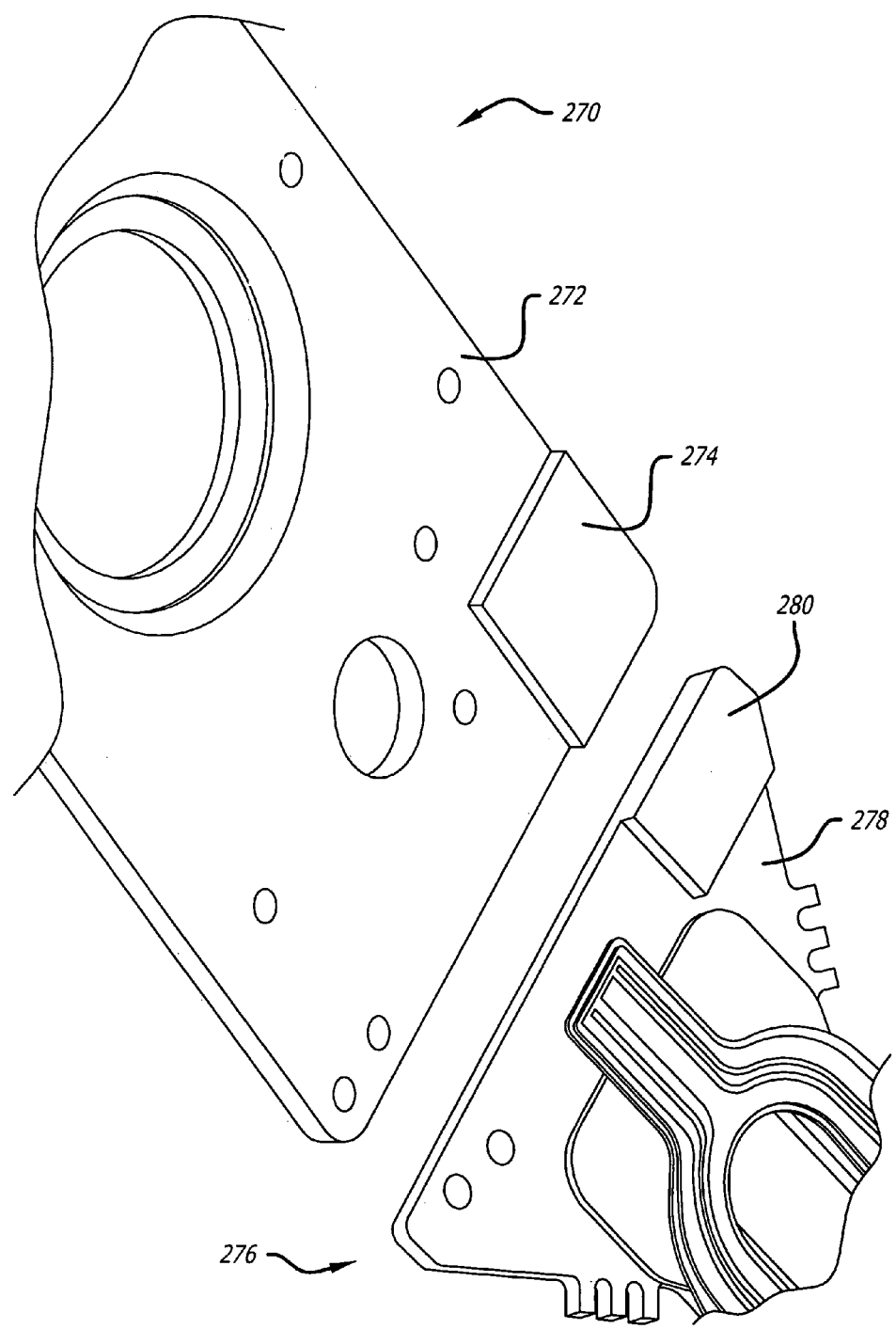
FIGS. 5 and 6 illustrate a configuration that can be adapted for use in conjunction with the present invention in which the mount plate and load beam have respective mesas, to create raised platforms onto which a spring plate is mounted.
Figure 6:
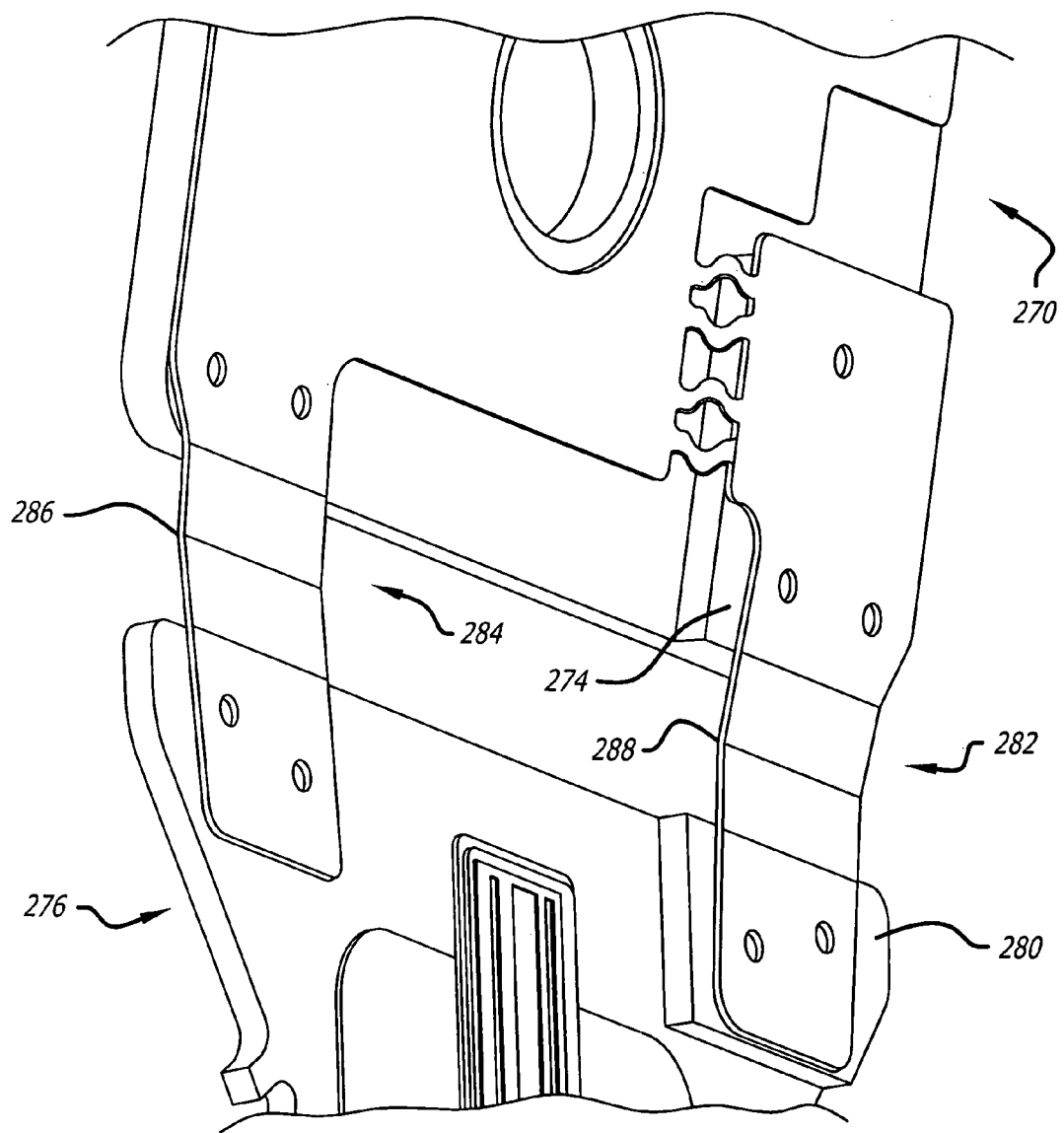

Referring to FIGS. 5 and 6, this approach begins with a base plate and then etches away most of it, leaving a mesa. Both the mount plate and load beam are formed with mesas, which are located adjacent to one another and which complement one another. In FIG. 5, the mount plate 270 has etched-away portion 272 and mesa 274. Similarly, the load beam 276 has an etched-away portion 278 and a mesa 280.

FIG. 6 illustrates spring plates 282, 284 extending from the mount plate 270 to the load beam 276. One spring plate 282 extends from one mesa 274 to the other mesa 280, such that the spring plate 282 is raised relative to the corresponding spring plate 284. One potential advantage of attaching the spring plates 282 and 284 to mesas 274 and 280, and etching the areas surrounding the mesas, derives from the fact that it can be difficult to etch a surface to a uniform depth. By affixing the spring extensions to unetched mesas 274 and 280 surrounded by etched areas, the surfaces for attaching to the spring extensions can be kept smooth and uniform. The spring plates 282 and 284 may have corresponding shallow V-shaped bends 286 and 288 respectively formed therein. The bends may be formed after the spring plates are welded in place. This V-shaped bend creates a pre-load force, to aid in the function of the assembly. Advantages of providing a pre-load on suspension assemblies in order to create the provide amount of spring bias toward the spinning platter, are known in the art.

Figure 7:
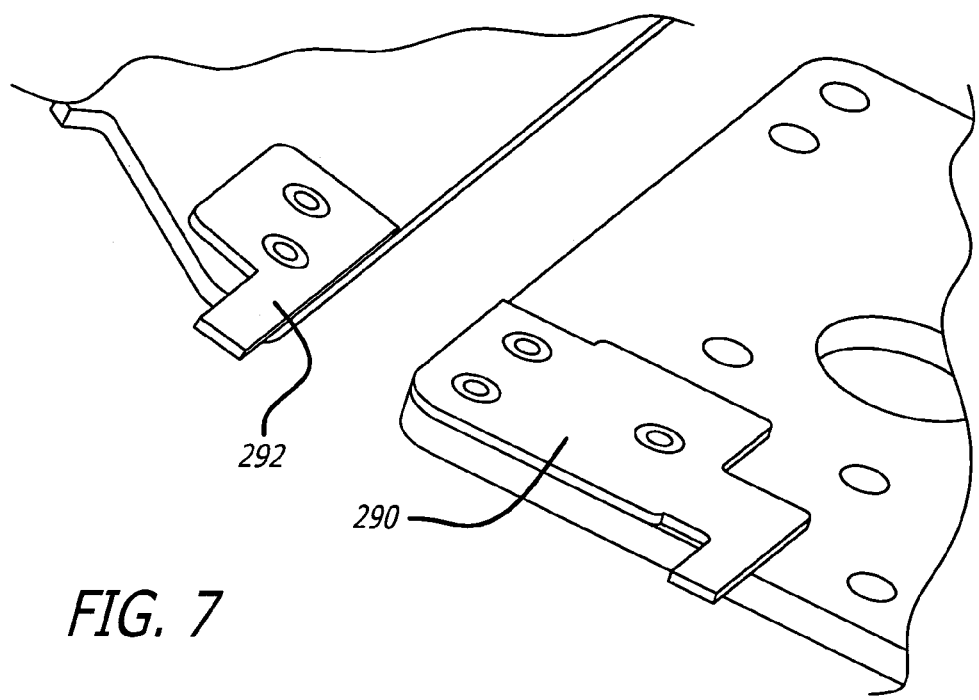
FIG. 7 illustrates a known approach to create vertical spacing between spring arms by using spacers.
Figure 8:
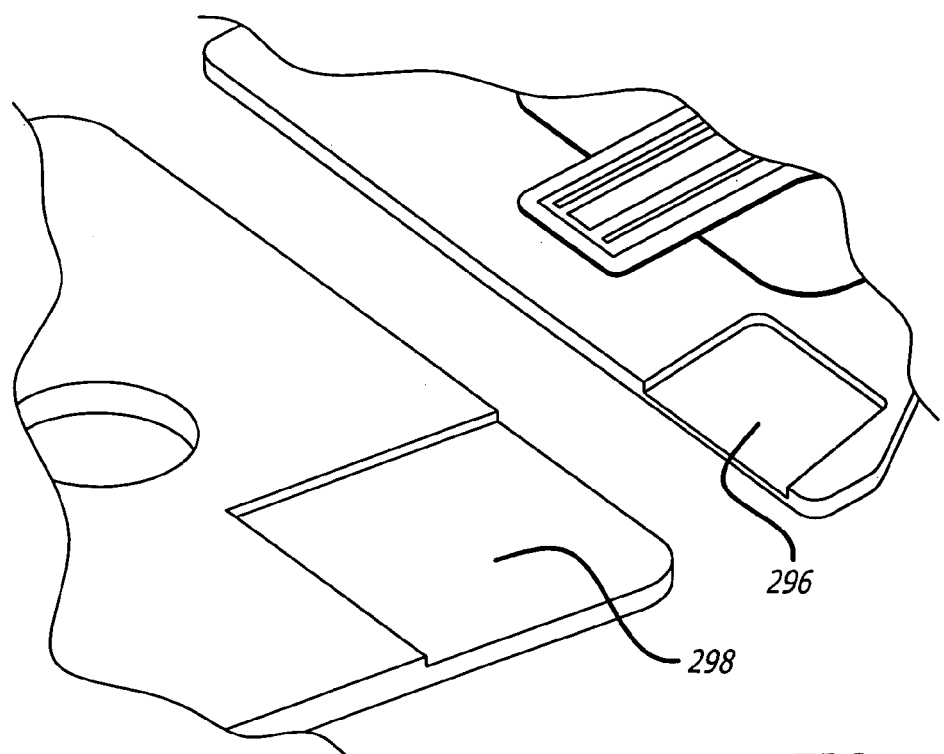
FIG. 8 illustrates an alternative to the approach of FIG. 7, wherein corners of the mount plate and load beam are etched.

Considering another approach, FIG. 7 illustrates the use of spacers 290, 292 in order to create raised "platforms" onto which a spring arm may be attached. The spacers 290, 292 serve to raise the spring arm, such that it is spaced above a spring arm attached on the opposite side of the assembly (not shown), where there are no spacers. As an alternative to this approach, FIG. 8 illustrates two etched regions 296, 298 into which a spring arm may be attached. This spring arm is then lower than a spring arm attached to the opposite side, where there are no etched indentations, thereby creating the desired vertical offset between spring arms.

Figure 9:
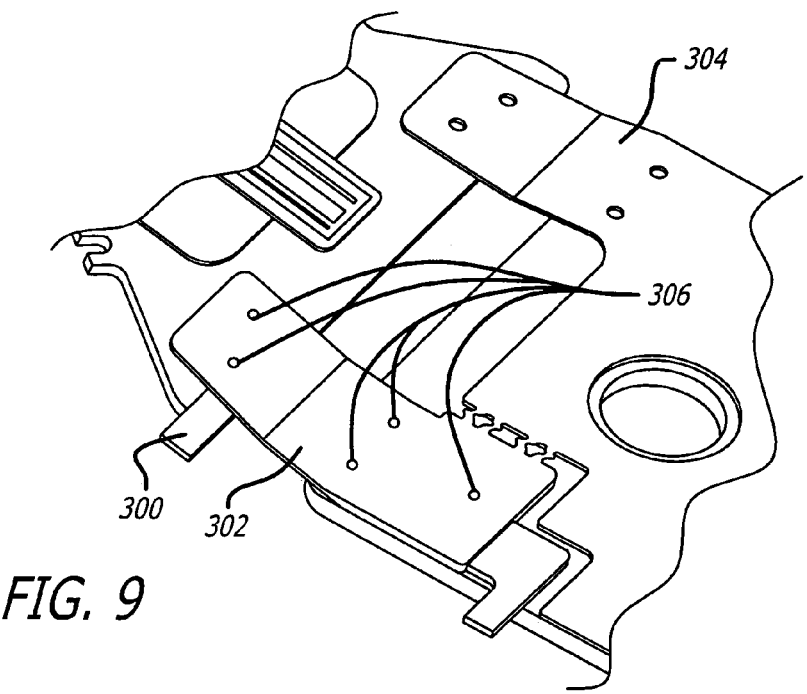
FIG. 9 illustrates a known approach in which spacers, rather than etching, are used to create the vertical offset in the spring arms, with 3-way welds being used on a portion of the spring arm.
Figure 10:
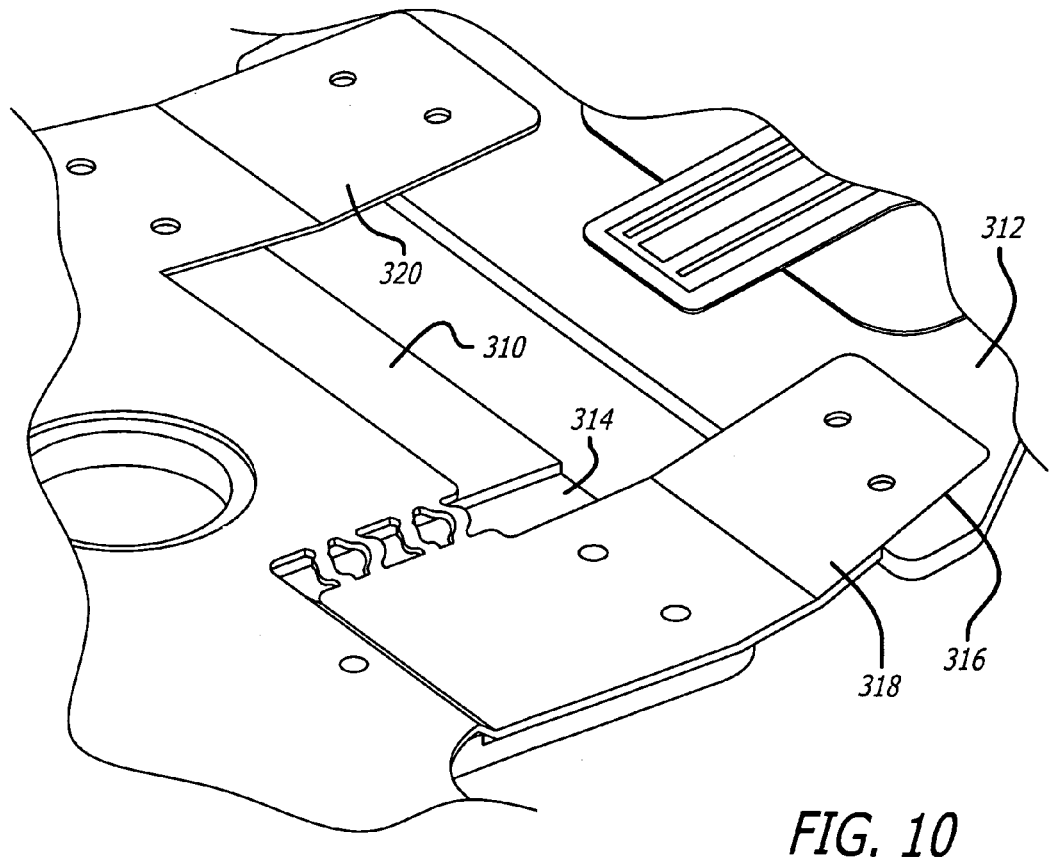
FIG. 10 illustrates an alternative approach to that of FIG. 9, in which etching is used to reduce to a two-way weld.

FIG. 9 illustrates a concept similar to that of FIG. 7, in which a spacer 300 is used to elevate spring arm 302 relative to spring arm 304. It is noted that the spring arm 302 requires a three-way weld in area 306 in order to attach the arm to the assembly. FIG. 10 illustrates an alternative approach in which no spacer is used. Instead the mount plate 310 and the load beam 312 include respective etched indentations 314, 316. The indentations 314, 316 allow the spring arm 318 to be lower than the corresponding spring arm 320, which is attached to the unetched top of the mount plate 310 and the load beam 312. This creates the desired vertical offset.

A further advantage of the approach of FIG. 10 is that the spring arm 318 can be attached to the indentations 314, 316 with two-way welds, which are simpler and less costly than the three-way welds of FIG. 9.

In summary, referring to FIGS. 7-10, one way to create a vertical offset is to shim up one of the spring fingers (a "finger" being a structural extension similar to a "spring plate" or the like that acts as a hinge). Rather than engaging in this "shimming up," both of the mounting surfaces (on the load beam and mount plate) are etched down in order to drop one or both of the fingers.

As to materials used to form the various structures discussed herein, it is noted that the various members disclosed herein can be made of materials known in the art. In many of the embodiments, one or more components will be made of a composite laminate material. Some of these embodiments include a visco-elastic layer such as polyimide to assist in structural damping during operation of the hard drive. Further structural aspects are discussed in the previously-noted U.S. patent application Ser. Nos. 11/119,363 and 11/119,364, both of which were filed on Apr. 29, 2005, and which are incorporated by reference herein.

It should be noted that, in the following claims, the term "spring extension" can mean a stand-alone plate as show in FIG. 1, or an "arm" or "finger" of a larger structure, as shown in FIGS. 8 and 9. That is, a "spring extension" may be a plate, an arm or finger, or similar structure connecting the load beam to the mount plate. Also, the term "means for" as used in the following claims, is intended to claim only the structure recited in the specification and structural equivalents.

As a further matter of terminology, the meaning of "mount plate" as used in the claims is expanded to also mean "base plate," so that a claim in which the term "mount plate" appears also includes alternative embodiments in which a base plate is used rather than a mount plate.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A suspension assembly for a hard disk drive, the suspension assembly comprising:
   a load beam;
   a mount plate;
   first and second spring extensions extending between the load beam and the mount plate;
   a vertical offset between the first and second spring extensions; and
   at least one etched area on at least one of the load beam and mount plate, the etched area facilitating the vertical offset;
   wherein at least one of a spring extension, the load beam and the mount beam comprise a laminate material.

2. A suspension assembly as defined in claim 1, wherein the mount plate and load beam comprise a laminate material.

3. A suspension assembly as defined in claim 2, wherein the laminate material has at least three layers.

4. A suspension assembly as defined in claim 2, wherein the laminate material comprises two layers of stainless steel and a layer of polyimide disposed between the two layers of stainless steel.

5. A suspension assembly as defined in claim 2, wherein a corner of the mount plate and a corresponding corner of the load beam are etched.

6. A suspension assembly as defined in claim 1, wherein the mount plate comprises a laminate material, and wherein on one side of one end of the mount plate, a top portion of the material has been etched off, and wherein a bottom portion of the material on the other side has been etched off, thereby forming two adjacent cantilevers vertically spaced from one another.

7. A suspension assembly as defined in claim 6, wherein the mount plate is pre-split through the layers of the composite prior to being etched.

8. A suspension assembly as defined in claim 1, wherein a spring extension is formed of a laminate material, the spring extension being etched on either end to form a raised center portion.

9. A suspension assembly as defined in claim 8, wherein there is a gap between said load beam and said mount plate, said raised center portion spanning the gap.

10. A suspension assembly as defined in claim 8, wherein the assembly includes two spring extensions, a first spring extension being etched to form a raised center portion and a second spring extension that is relatively flat compared to said first spring extension.

11. A suspension assembly as defined in claim 1, wherein the mount plate has a first mesa and said load beam has a second mesa, said first and second mesas being substantially adjacent one to the other, with a spring extension extending from the first mesa to the second mesa.

12. A suspension assembly as defined in claim 11, wherein a second spring extension extends from a non-mesa portion of the mount plate to a non-mesa portion of the load beam.

13. A suspension assembly as defined in claim 1, wherein the mount plate includes a first recess and the load beam includes a second recess, with a spring arm extending from the first recess to the second recess.

14. A suspension assembly for a hard disk drive, the suspension assembly comprising:
    a load beam;
    a mount plate;
    first and second spring extensions extending between the load beam and the mount plate;
    a vertical offset between the first and second spring extensions; and
    means for facilitating the vertical offset;
    wherein at least one of a spring extension, the load beam and the mount beam comprise a laminate material.

15. A suspension assembly as defined in claim 14, wherein the means for facilitating the vertical offset comprises at least one etched area on one of the load beam and mount plate.

16. A suspension assembly as defined in claim 14, wherein the means for facilitating the vertical offset comprises an etched corner of the mount plate substantially adjacent to an etched corner of the load beam.

17. A suspension assembly as defined in claim 14, wherein the means for facilitating the vertical offset comprises an etched top portion of the mount plate forming a first cantilever beam, an etched bottom portion of the mount plate forming a second cantilever beam, said etched bottom portion of the mount plate being adjacent to the etched top portion of the mount plate, thereby forming two adjacent cantilevers vertically spaced from one another.

18. A suspension assembly as defined in claim 14, wherein at least one of said mount plate, said load beam, and said spring extension comprises an etched composite material having at least three layers.

19. A suspension assembly as defined in claim 14, wherein the mount plate has a first mesa and said load beam has a second mesa, said first and second mesas being substantially adjacent one to the other, with a spring extension extending from the first mesa to the second mesa.

20. A suspension assembly as defined in claim 14, wherein the means for facilitating the vertical offset comprises the spring extension being formed from a composite material having at least three layers, the spring extension having at least one etched area that facilitates the vertical offset.

21. A method of achieving a vertical offset between a first and a second spring extension on a suspension assembly for a disk drive as defined in claim 1, the method comprising the steps of:
   etching portions of the load beam and mount plates, wherein at least one etched portion is etched from a composite material; and
   extending at least one of said first and second spring extensions from an etched portion of said load beam to an etched portion of said mount plate.

22. A method as defined in claim 21, wherein the step of etching portions of the load beam and mount plates comprises etching a mesa on at least one of said load beam and mount plate.

23. A method as defined in claim 21, wherein the etching step comprises etching through at least one layer of a laminate material.

24. A method as defined in claim 21, wherein the method further includes providing means for passive damping.

25. A method as defined in claim 21, wherein a first chemical is used to etch a first layer of at least one of the load beam and the mount plate, and wherein a second chemical is used to etch a second layer of at least one of the load beam and the mount plate.

26. A method as defined in claim 21, wherein said first layer is stainless steel and is etched with ferric chloride, and wherein said second layer is polyimide and is etched with sodium hydroxide.

27. A suspension assembly for a hard disk drive, the suspension assembly:
   a load beam;
   a mount plate;
   first and second spring extensions extending between the load beam and the mount plate, at least one of the spring extensions comprising a composite material;
   a vertical offset between the first and second spring extensions; and
   at least one etched area on the spring extension that comprises a composite material, the etched area facilitating the vertical offset.

28. A suspension assembly as defined in claim 27, wherein the first spring extension is etched to form a raised center portion and the second spring extension is relatively flat compared to said first spring extension.

29. A suspension assembly as defined in claim 27, wherein the first spring extension comprises a composite material having at least three layers.

30. A suspension assembly as defined in claim 27, wherein there is a gap between said load beam and said mount plate, said raised center portion extending across the gap.

* * * * *

UNITED STATES PATENT AND TRADEMARK OFFICE
CERTIFICATE OF CORRECTION

| | | |
|---|---|---|
| PATENT NO. | : 7,573,680 B1 | Page 1 of 1 |
| APPLICATION NO. | : 11/364127 | |
| DATED | : August 11, 2009 | |
| INVENTOR(S) | : Sivadasan Kulangara | |

It is certified that error appears in the above-identified patent and that said Letters Patent is hereby corrected as shown below:

Title Page; item (57);
In the abstract, line 17, after "mount," delete "beam" and insert -- plate --.

In column 2, line 11, after "mount," delete "beam" and insert -- plate --.

In claim 1, column 7, line 67, delete "beam" and insert -- plate --.

In claim 14, column 8, line 56, delete "beam" and insert -- plate --.

In claim 22, column 9, line 30, delete "plates" and insert -- plate --.

In claim 27, column 10, line 13, after "assembly" insert -- comprising --.

Signed and Sealed this

Thirteenth Day of October, 2009

David J. Kappos
*Director of the United States Patent and Trademark Office*